United States Patent
Inoue (10) Patent No.: US 7,015,172 B2
(45) Date of Patent: Mar. 21, 2006

(54) PHOSPHATE PHOTOCATALYST COMPRISING METAL ION IN $D^{10}$ OR $D^0$ ELECTRON STATE

(75) Inventor: Yasunobu Inoue, Nagaoka (JP)

(73) Assignee: Japan Science and Technology Agency, Saitama (JP)

( * ) Notice: Subject to any disclaimer, the term of this patent is extended or adjusted under 35 U.S.C. 154(b) by 30 days.

(21) Appl. No.: 10/481,794

(22) PCT Filed: Jun. 12, 2002

(86) PCT No.: PCT/JP02/05862

§ 371 (c)(1),
(2), (4) Date: Dec. 23, 2003

(87) PCT Pub. No.: WO03/008097

PCT Pub. Date: Jan. 30, 2003

(65) Prior Publication Data

US 2004/0204313 A1 Oct. 14, 2004

(30) Foreign Application Priority Data

Jul. 12, 2001 (JP) .......................... 2001-211959

(51) Int. Cl.
*B01J 27/14* (2006.01)
*B01J 27/188* (2006.01)
*B01J 27/185* (2006.01)
*B01J 23/58* (2006.01)
*B01J 23/16* (2006.01)

(52) U.S. Cl. .................. 502/208; 502/210; 502/213; 502/330; 502/353

(58) Field of Classification Search ............... 502/208, 502/210, 213, 330, 353, 206
See application file for complete search history.

(56) References Cited

U.S. PATENT DOCUMENTS 6,368,668 B1 * 4/2002 Kobayashi et al. ...... 427/376.2
6,482,767 B1 * 11/2002 Inoue ........................ 502/326

FOREIGN PATENT DOCUMENTS

JP        07-088370    * 4/1995

(Continued)

OTHER PUBLICATIONS

Norihiro Tanaka, "PO4 Shimentai o Fukumu Tunel Kozo Kagobutst ni yoru Tikari Bunkai Hanno", Dai 88 Kai Shokubai Toronkai Toronkai A Yokoshu (Sep. 20, 2001), Dai 88 Kai, p. 177.*

(Continued)

*Primary Examiner*—J. A. Lorengo
*Assistant Examiner*—Patricia L. Hailey
(74) *Attorney, Agent, or Firm*—Sherman & Associates (57) ABSTRACT

A photo-catalyst comprising a compound having structure composing a network formed by mutual connection of an unit constructing oxygen octahedra or tetrahedra containing a transition metal ion or a typical metallic ion in $d^{10}$ or $d^0$ configuration and an unit constructing $PO_4$ tetrahedron connected to said oxygen octahedra or tetrahedra, further containing an alkali metal besides said metallic ion as a constituent element, for example,

$A_X Nb_{2m} P_4 O_{6m+8}$ (wherein A is Na, K or Li, X is 2, 3 or 4 and m is 3, 3.5 or 4)

$A_X Ta_{2m} P_4 O_{6m+8}$ (wherein A is Na, K or Li, X is 2, 3 or 4 and m is 3, 3.5 or 4)

$A_X In_{2m} P_4 O_{6m+8}$ (wherein A is Na, K or Li, X is 2, 3 or 4 and m is 3, 3.5 or 4)

and $RuO_2$ is loaded on the compound. The photo-catalyst can be used for the complete decomposition of water.

12 Claims, 12 Drawing Sheets

FOREIGN PATENT DOCUMENTS

| | | | |
|---|---|---|---|
| JP | 2002-059008 | * | 2/2002 |
| JP | 2002-301369 | * | 10/2002 |
| JP | 2004-097924 | * | 4/2004 |
| JP | 2004-097925 | * | 4/2004 |

OTHER PUBLICATIONS

J. Sato et al., "New Photocatalyst Group for Water Decomposition of $RuO_2$-Loaded p-Block Metal (In, Sn, and Sb) Oxides with d10 Configuration,", Journal of Physical Chemistry B, vol. 105, No. 26, Jul. 5, 2001, pp. 6010-6063.*

* cited by examiner

PHOSPHATE PHOTOCATALYST COMPRISING METAL ION IN $D^{10}$ OR $D^0$ ELECTRON STATE

FIELD OF THE INVENTION

The present invention relates to a $RuO_2$-loaded phosphate photo-catalyst having novel structure containing metallic ion in $d^{10}$ or $d^0$ configuration, and further containing alkali metal such as Na, K or Li as a consituent element, in particular relates to a catalyst for the complete decomposition of water.

BACKGROUND OF THE INVENTION

The photo decomposing reaction of water have been interested in from the view point of photo energy transformation. And the photo-catalyst which indicates activity to the photo decomposing reaction can be considered as a high quality photo functional material providing a function such as photo absorption, electrolytic separation or oxidation-reduction reaction at the surface.

The inventors of the present invention already reported that $BaTiO_4O_9$ having pentagonal prism shape tunnel structure or $M_2Ti_6O_{13}$ (M=Na, K, Rb) having oblong shape tunnel structure can own an excellent activity to the complete decomposing reaction of water. Further, the inventors of the present invention also reported that in the case of this catalyst, the photocatalytic activity changes depend on the temperature at the oxidizing treatment, and in the case of $BaTiO_4O_9$, the inner crystalline polarization (increase of dipole moment) caused by incommensurate structure of $TiO_2$ octahedron contributes the high activity.

However, the reported solid photo-catalyst which is useful for the complete photocatalytic decomposing reaction is an oxide of transition metal in $d^0$ configuration and limited to an oxide containing Ti, Zr, Nb and Ta.

The subject of the present invention is to provide a photo-catalyst of novel chemical constitution and structure apart from above mentioned metal oxide.

Aiming to dissolve above mentioned subject, the inventors of the present invention, tried to obtain a novel phosphate photo-catalyst by extending to the phosphate containing a transition metal ion or a typical metallic ion in $d^{10}$ or $d^0$ configuration. The photo-catalytic activity, in particular, the photo-catalyst for the complete decomposition of water of the compound obtained by calcining the blended product consisting of supplying source for transition metal and typical metal ion, supplying source of alkali metal and supplying source of phosphoric acid by changing the calcination temperature and to which $RuO_2$ is loaded is investigated, and then the dipole moment of the phosphate compound which brings high activity is calculated. Consequently, it becomes clear that the oxygen octahedrally surrounding above mentioned transition or typical metallic ion is becoming more strained structure, and also it becomes clear that the compound having a structure indicating high activity as the photo-catalyst for complete decomposition of water by regulating calcination temperature can be obtained, when $RuO_2$ is loaded, thus the subject of the present invention is accomplished.

DISCLOSURE OF THE PRESENT INVENTION

The basic constitution of the present invention is a $RuO_2$-loaded phosphate, photo-catalyst, comprising a compound having structure composing a network formed by mutual connection of an unit constructing oxygen octahedra or tetrahedra containing a transition metal ion or a typical metallic ion in $d^{10}$ or $d^0$ configuration and an unit constructing $PO_4$ tetrahedra connected to said oxygen octahedra or tetrahedra, further containing an alkali metal besides said metallic ion as a consituent element.

The $1^{st}$ invention based on the basic invention of the present invention is the $RuO_2$-loaded phosphate photo-catalyst of said basic invention, wherein a metal composing the transition metal ion in $d^0$ configuration is Nb or Ta, chemical composition of the compound is $A_xMe_{2m}P_4O_{6m+8}$ (wherein A is Na, K or Li, Me is Nb or Ta, X is 2, 3 or 4 and m is 3, 3.5 or 4), desirably the $1^{st}$ invention based on the basic invention is the $RuO_2$-loaded photo-catalyst, wherein the oxygen octahedra containing the transition metal ion in $d^0$ configuration has strained structure, dipole moment and has a network structure. More desirably, the $1^{st}$ invention based on the basic invention is the $RuO_2$-loaded photo-catalyst, wherein the network is belonging to tungsten bronze phosphates having tunnel structure.

The $2^{nd}$ invention based on the basic invention of the present invention is the $RuO_2$-loaded photo-catalyst of said basic invention, wherein a metal composing the transition metal ion in $d^{10}$ configuration is In, chemical composition of the compound is $A_3In_mP_{m+1}O_{4m+4}$ (wherein A is Na, K or Li ion, m is 1 or 2). Desirably, the $2^{nd}$ invention based on the basic invention is the $RuO_2$-loaded photo-catalyst wherein the oxygen octahedron containing the transition metal ion in $d^{10}$ configuration is strained and has dipole moment and has a network structure.

The $3^{rd}$ invention of the present invention is the photo-catalyst for complete decomposition of water consisting of said basic invention and $1^{st}$ and $2^{nd}$ inventions based on the basic invention.

DESCRIPTION OF THE PREFERRED EMBODIMENT

The present invention will be illustrated more in detail.

(1) Preparation of $A_XMe_{2m}P_4O_{6m+8}$

At the preparation of $A_XMe_{2m}P_4O_{6m+8}$, as the supplying material for alkali metal, for example, compound which provide alkali metal at the calcination such as $A_2CO_3$ (A is alkali metal), as the Nb supplying material, for example, $Nb_2O_5$ or compound which generates $Nb_2O_5$ by calcination and as the starting material for phosphoric acid, compound which supply phosphoric acid by calcination such as $(NH_4)_2HPO_4$ are used. These compounds are weighted so as to be stoichiometric ratio, mixed by an appropriate mixing machine, transferred to an alumina crucible for calcination, then calcined by an electric furnace under atmospheric pressure at the temperature from 700° C. to 1150° C. for 16 hours. Thus $A_XMe_{2m}P_4O_{6m+8}$ is prepared.

(2) Preparation of $A_XTa_{2m}P_4O_{6m+8}$ (Wherein A is Na, K or Li, X is 3 or 4, m is 3, 3.5 or 4)

As the supplying material for alkali metal and material for phosphoric acid, same compound to above (1) can be used. As the supplying material for Ta, for example, $Ta_2O_5$ or a compound which generates $Ta_2O_5$ by calcination can be used. These compounds are weighted so as to be stoichiometric ratio, mixed by an appropriate mixing machine, transferred to an alumina crucible for calcination, then calcined by an electric furnace under atmospheric pressure at the temperature from 800° C. to 1100° C. for 16 hours. Thus $A_XTa_{2m}P_4O_{6m+8}$ is prepared.

(3) Preparation of $A_3InP_2O_8$ (A is alkali metal such as Na, K or Li)

As the supplying material for alkali metal and material for phosphoric acid, same compound to above (1) can be used. As the supplying material for $In_2O_3$, for example, $In_2O_3$ or a compound which generates $In_2O_3$ by calcination can be used. These compounds are weighted so as to be stoichiometric ratio, mixed by an appropriate mixing machine, transferred to an alumina crucible for calcination, then calcined by an electric furnace under atmospheric pressure at the temperature of 850° C. for 16 hours. Thus $A_3InP_2O_8$ is prepared.

(4) Method to load $RuO_2$ on the Compounds Obtained in said (1) to (3).

To the phosphate compound obtained in said (1) to (3) $RuO_2$ is loaded using Ru carbonyl complex $Ru_3(CO)_{12}$. $Ru_3(CO)_{12}$ is dissolved in tetrahydrofrane (hereinafter shortened to THF) so as the loading amount of $RuO_2$ (converted to metal Ru) to be prescribed weight %. Phosphate compound is added to the obtained solution and refluxed for 4 hours at 60° C. with constant stirring by a stirrer. After that, THF is evaporated using an aspirator and dried in a drying oven of 80° C. for 30 minutes. Under the atmospheric pressure, the obtained product is oxidized by the condition of 300° C. to 600° C. temperature for 5 hours and the $RuO_2$-loaded photo-catalyst is obtained.

Ru (acac) can be used instead of $Ru_3(CO)_{12}$.

(5) Reaction Apparatus for Testing the Activity of Photo-Catalyst of Complete Decomposition of Water The photo decomposing reaction of water is carried out using closed circulation type reaction apparatus. This apparatus is consisting of a high vacuum exhausting part, a reacting cell for light irradiation made of quartz, a circulation pump for air circulation, a pressure gage and a gas chromatograph which is directly connected to the reaction apparatus for the purpose to measure the composition of gas. As the light source, Xe short arc lamp is used by 400w condition, or Hg—Xe lamp is used by 200W condition.

(6) Reactive Condition

In said quartz reacting cell, 250 mg of prepared photo-catalyst and 30 mL of ultra-pure water are contained and equipped to the reaction system and inner air is exhausted by vacuum. For the purpose to remove dissolved oxygen in water completely, argon gas is brown in the water more than 40 minutes, then is exhausted by vacuum again. After that, argon gas is introduced into system by 100 torr, and the catalyst is dispersed into water by circulation using a circulation pump, and light is irradiated to carry out the reaction. The quantitative analysis of generated $H_2$ and $O_2$ gases is carried out by a gas chromatograph which is directly connected to the reaction apparatus.

EXAMPLES

The present invention will be illustrated more concretely according to the Examples, but not intending to interpret the scope of the present invention restrictly.

Example 1

The X ray diffract pattern of $Na_xNb_{2m}P_4O_{6m+8}$ (X is 2, 3 or 4, m=3, 3.5 or 4);

From the X ray diffract pattern of $Na_4Nb_8P_4O_{32}$ which was prepared by changing the calcination temperature from 700° C. to 1150° C., it was understood that $Nb_2O_5$ remains partially as a non reacted product. The X ray diffract pattern of the specimen prepared at the temperature limitation from 800° C. to 1100° C. generated strong peaks at 2θ=22.12°, 22.86° and 28.28° which are belonging respectively to (311), (330) and (331) face, and indicated good coincidence with the patterns described in JCPDS card.

At the temperature higher than 1150° C., since $Na_4Nb_8P_4O_{32}$ was fused and became glass state, $Na_4Nb_8P_4O_{32}$ was not suited to the use of the photo-catalyst. From this phenomenon, it became clear that $Na_4Nb_8P_4O_{32}$ prepared in the temperature region from 800° C. to 1000° C. is suited as the photo-catalyst.

The X ray diffract pattern of $Na_3Nb_8P_4O_{32}$ and $Na_2Nb_6P_4O_{36}$ prepared by the temperature 1000° C., showed good coincidence with the patterns described in JCPDS card.

Figure 1:
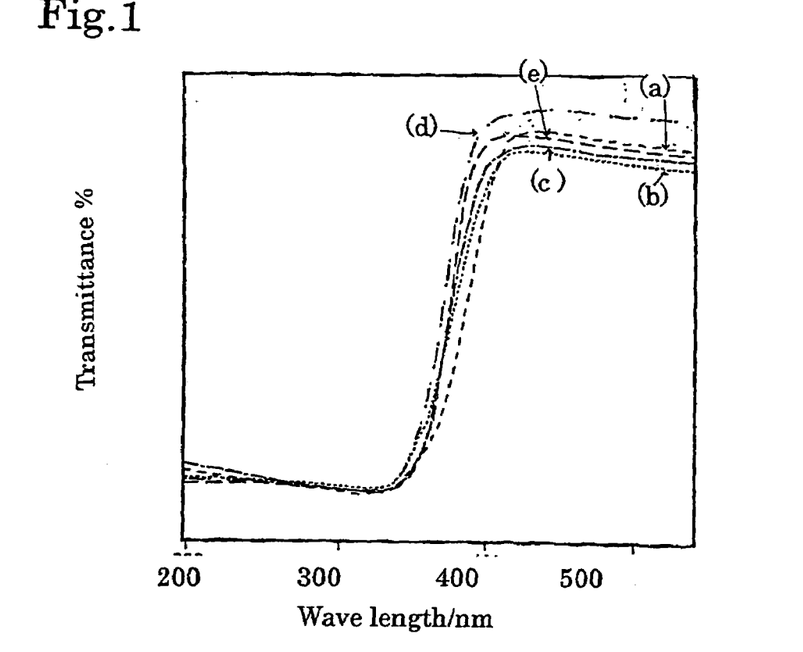
FIG. 1 shows the UV diffuse reflectance spectrum of $Na_4Ta_8P_4O_{32}$ prepared by calcination temperature from 800° C. to 1100° C. In the case of 800° C. (1073K) (a), the photo absorption starts from 420 nm and the maximum absorption wave length exists at closely to 350 nm. Along with the elevation of the calcination temperature, the absorption end shifts slightly to the shorter wave length side, and at the calcination temperature of 1100° C.(e), the absorption end becomes 400 nm, which is the shortest wave length. (b), (c) and (d) show respectively the UV diffuse reflectance spectrum of $Na_4Ta_8P_4O_{32}$ calcined at 900° C., 1000° C. and 1050° C. The change of the maximum absorption wave length along with the elevation of the calcination temperature is not observed. Incline of the absorption increased along with the elevation of the calcination temperature.

The reflectance spectrum of $Na_xNb_{2m}P_4O_{6m+8}$ (X is 2, 3 or 4, m=3, 3.5 or 4);

FIG. 1 shows the UV diffuse reflectance spectrum of $Na_4Ta_8P_4O_{32}$ prepared by calcination temperature from 800° C. to 1100° C. In the case of 800° C. (1073K) (a), the photo absorption started from 420 nm and the maximum absorption wave length existed at 350 nm around. Along with the elevation of the calcination temperature, the absorption end shifted slightly to the shorter wave length side, and at the calcination temperature of 1100° C.(e), the absorption end became 400 nm, which was the shortest wave length. The change of the maximum absorption wave length along with the elevation of the calcination temperature was not observed. Incline of the absorption increased along with the elevation of the calcination temperature.

Figure 2:
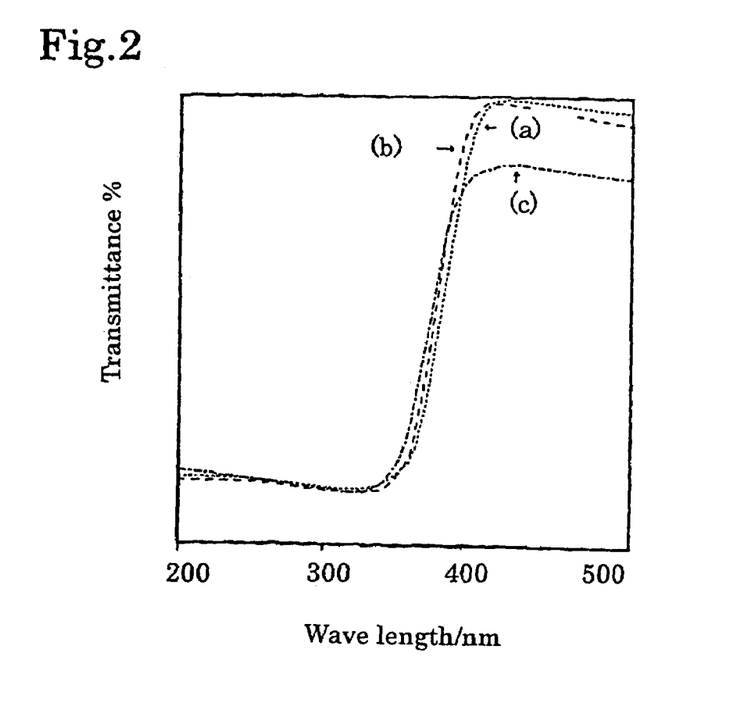
In FIG. 2, (a) shows the UV diffuse reflectance spectrum of $Na_4NB_6P_4O_{26}$ calcined at 1000° C. (1273K), (b) shows the UV diffuse reflectance spectrum of $Na_3Nb_7P_4O_{29}$ and (c) shows the UV diffuse reflectance spectrum of $Na_4Nb_8P_4O_{32}$. In the case of $Na_4NB_6P_4O_{26}$ (a), the absorption of light starts from 420 nm and indicates maximum absorption at 350 nm around. In the case of $Na_3Nb_7P_4O_{29}$ (b), the absorption of light starts from 410 nm and indicates maximum absorption at 350 nm around. And, in the case of $Na_4Nb_8P_4O_{32}$ (c), the absorption of light starts from 410 nm and indicates maximum absorption at 330 nm around.

In FIG. 2, following UV diffuse reflectance spectrums are shown in comparison, that is, $Na_4Nb_6P_4O_{26}$ (a) calcined at 1000° C., $Na_3Nb_7P_4O_{29}$ (b) and $Na_4Nb_8P_4O_{32}$ (c). In the case of $Na_4Nb_6P_4O_{26}$ (a), the absorption of light started from 420 nm and indicated the maximum absorption at 350 nm around. In the case of $Na_3Nb_7P_4O_{29}$ (b), the absorption of light started from 410 nm and indicated the maximum absorption at 350 nm around. And, in the case of $Na_4Nb_8P_4O_{32}$ (c), the absorption of light started from 410 nm and indicated the maximum absorption at 330 nm around.

Scanning electric microscope (SEM) image and average particle size; From the observation of SEM image of $Na_4Nb_8P_4O_{32}$, it was clearly understood that in the specimen prepared by calcination temperature of 800° C., large particles and small particles were mixed and the particle size was not uniform. In the specimen prepared by calcination temperature of 900° C. (1173K), the particles were fine and had uniform distribution, and in the case of 1000° C. particles became remarkably large and this phenomenon was maintained by 1100° C. And the average particle size of $Na_4Nb_8P_4O_{32}$ became larger from 2.4 μm to 4.3 μm along with the elevation of the calcination temperature.

The SEM images of $Na_4Nb_6P_4O_{26}$ and $Na_3Nb_7P_4O_{29}$ calcined at 1000° C., indicated a multi angled block particle shape having similar shape angle with $Na_4Nb_8P_4O_{32}$, and the average particle size of $Na_4Nb_6P_4O_{26}$ was 3.7 μm, and that of $Na_3Nb_7P_4O_{29}$ was 5.1 μm.

Figure 3:
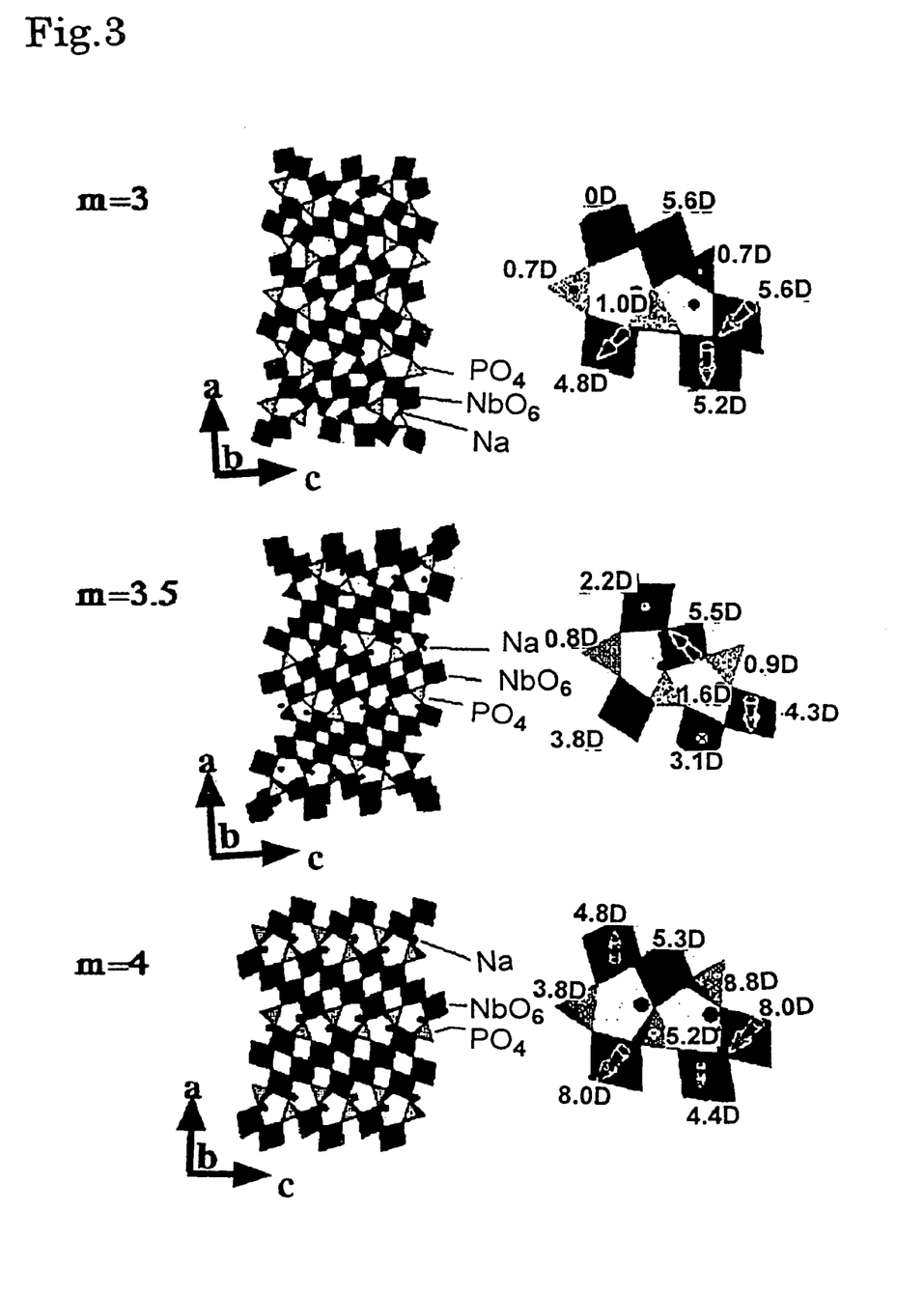
FIG. 3 shows the crystalline structure of $Na_xNb_{2m}P_4O_{6m+8}$ (X is 2, 3 or 4, m=3, 3.5 or 4), oxygen octahedron $NbO_6$ and dipole moment (an arrow) of $PO_4$ tetrahedron.

In FIG. 3, the crystalline structure of $Na_xNb_{2m}P_4O_{6m+8}$ (X is 2, 3 or 4, m=3, 3.5 or 4), oxygen octahedron $NbO_6$ and dipole moment (an arrow) of $PO_4$ tetrahedron and the configuration in Na crystalline are shown. And in Table 1, the dipole moment (Debye) of the crystal shown in FIG. 3 and the photo decomposition activity characteristic (mol 1 hour (h)) of water of the photo-catalyst prepared by loading $RuO_2$ to the crystal are shown.

TABLE 1

TABLE 1-continued

| $Na_xNb_{2m}P_4O_{6m+8}$ | dipole moment/ Debye | photo-catalytic activity/ $\mu$ mol h$^{-1}$ |
|---|---|---|
| $Na_4Nb_8P_4O_{32}$ |  |  H$_2$ / O$_2$ |

The reaction characteristics of $RuO_2/Na_xNb_{2m}P_4O_{6m+8}$ (X is 2, 3 or 4, m=3, 3.5 or 4) by photo-catalyst is illustrated as follows.

Figure 4:
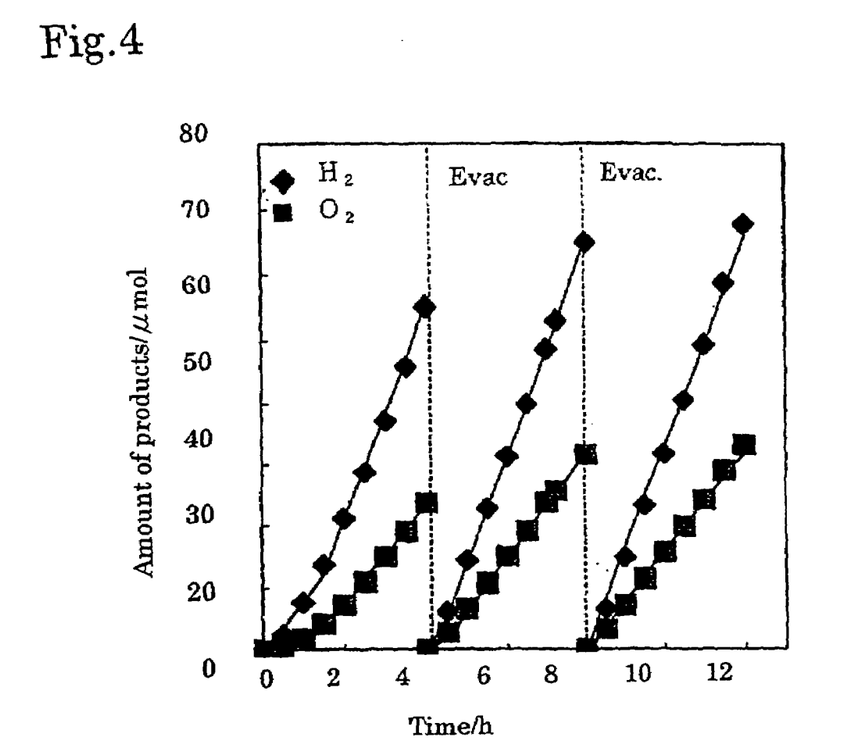
FIG. 4 shows photo-catalytic reaction of water decomposition in repeated run on a $RuO_2/Na_4Nb_8P_4O_{32}$ photo-catalyst under 100W Hg—Xe lamp as a light source. $Na_4Nb_8P_4O_{32}$ (X=4, m=4) was obtained by calcination at 1050° C. and loaded Ru species was oxidized at 450° C. In the first run, an induction period is observed at the initial stage of the reaction and in the second run, small induction period is observed. In the third run, $H_2$ and $O_2$ generates from the initial stage and the generating ratio of $H_2$ and $O_2$ is 2:1.

In FIG. 4, photo-catalytic reaction of water decomposition in repeated run on a $RuO_2/Na_4Nb_8P_4O_{32}$ photo-catalyst under 100W Hg—Xe lamp as a light source is shown. $Na_4Nb_8P_4O_{32}$ (X=4, m=4) was obtained by calcination at 1050° C. and loaded Ru species was oxidized at 450° C. In the first run, an induction period is observed at the initial stage of the reaction and in the second run, small induction period is observed. In the third run, $H_2$ and $O_2$ generates from the initial stage and the generating ratio of $H_2$ and $O_2$ is 2:1.

Figure 5:
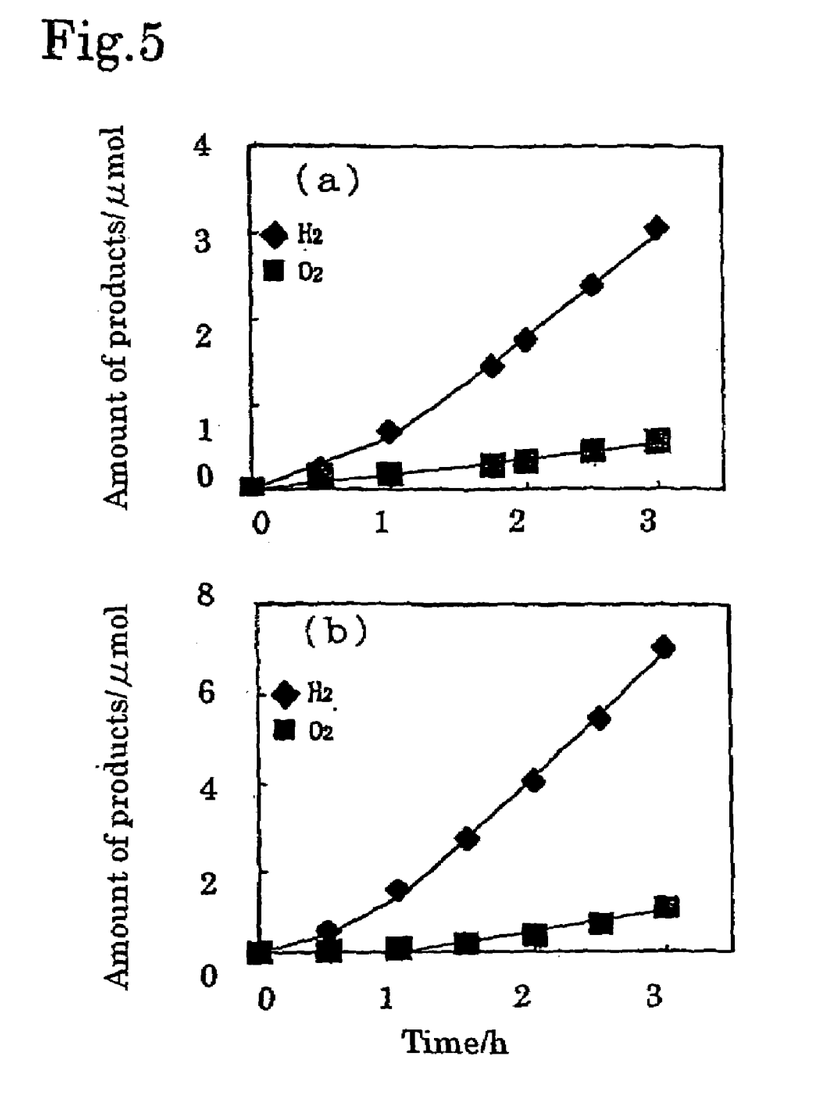
FIG. 5 shows photo-catalytic reaction of water decomposition in repeated run on a $RuO_2/Na_2Nb_6P_4O_{26}$ (a) and a $RuO_2/Na_3Nb_7P_4O_{29}$ (b) photo-catalyst under 100W Hg—Xe lamp as a light source.
Figure 6:
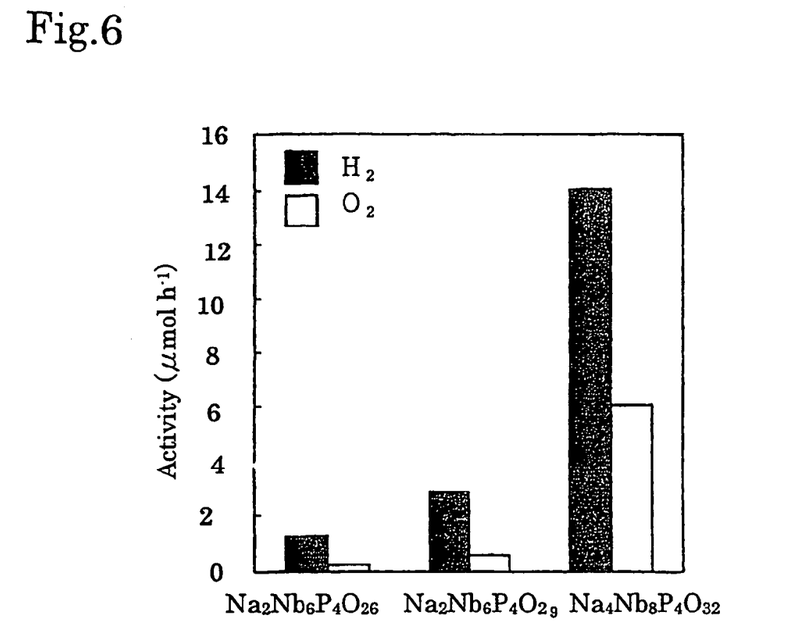
FIG. 6 shows the comparison of photo-catalytic activity of $RuO_2/Na_2Nb_6P_4O_{26}$, $RuO_2/Na_3Nb_7P_4O_{29}$ and $RuO_2/Na_4Nb_8P_4O_{32}$.

In FIG. 5, the results of photo decomposing reaction of water by photo-catalyst $RuO_2/Na_2Nb_6P_4O_{26}$ (a) and $RuO_2/Na_3Nb_7P_4O_{29}$(b) are shown. In the case of $RuO_2/Na_2Nb_6P_4O_{26}$, the generation of $O_2$ increased linearly from the initial stage, however, regarding the generation of $H_2$, the induction period was observed and after 1.5 hours lapse, the generation of $H_2$ increased linearly. The rate where the photo-catalyst reaction becomes the steady state was used as the aim of the photo-catalytic activity, and the photo-catalytic activity of $RuO_2/Na_2Nb_6P_4O_{26}$, $RuO_2/Na_3Nb_7P_4O_{29}$ and $RuO_2/Na_4Nb_8P_4O_{32}$ were compared (FIG. 6).

As clearly understood from FIG. 6, the photo-catalytic activity of these photo-catalysts can be ranked as follows. That is, $RuO_2/Na_2Nb_6P_4O_{26}<RuO_2/Na_3Nb_7P_4O_{29}<RuO_2/Na_4Nb_8P_4O_{32}$. Especially, in the case of $H_2$ generating activity, $RuO_2/Na_4Nb_8P_4O_{32}$ displayed from 5 times to 10 times higher activity than other photo-catalysts.

Figure 7:
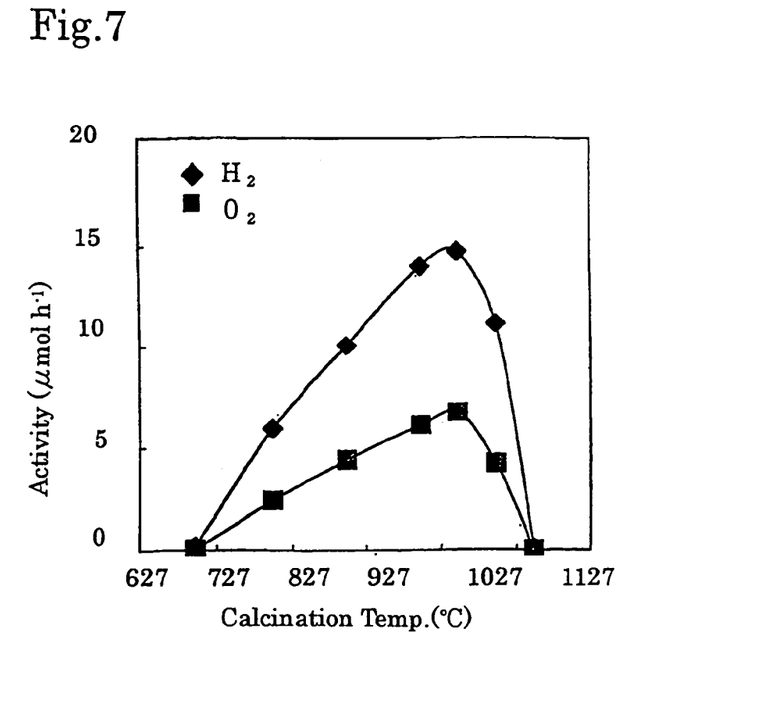
FIG. 7 shows the relationship of the calcination temperature of $Na_4Nb_8P_4O_{32}$ which has influence on the photo-catalytic activity of $RuO_2/Na_4Nb_8P_4O_{32}$.

The relationship of the calcination temperature of $Na_4Nb_8P_4O_{32}$ which has influence on the photo-catalytic activity of $RuO_2/Na_4Nb_8P_4O_{32}$;

In FIG. 7, the dependency of the calcination temperature of $Na_4Nb_8P_4O_{32}$ which has influence on the photo-catalytic activity of $RuO_2/Na_4Nb_8P_4O_{32}$ is shown. In the case of photo-catalyst calcined at 700° C., the activity of both $H_2$ and $O_2$ became very low. The activity was improved along with the elevation of the calcination temperature, and indicated the maximum activity at 1050° C., and by calcination by higher temperature than said temperature, the photo-catalytic activity became low. When the $H_2/O_2$ ratio was compared, the ratio at 800° C. was 2.5, at 1050° C. was 2.2 and at 1100° C. was 2.7, and these results showed that the photo-catalyst having higher activity displayed closer $H_2$ and $O_2$ generating ratio 2:1, which is the stoichiometric ratio.

Figure 8:
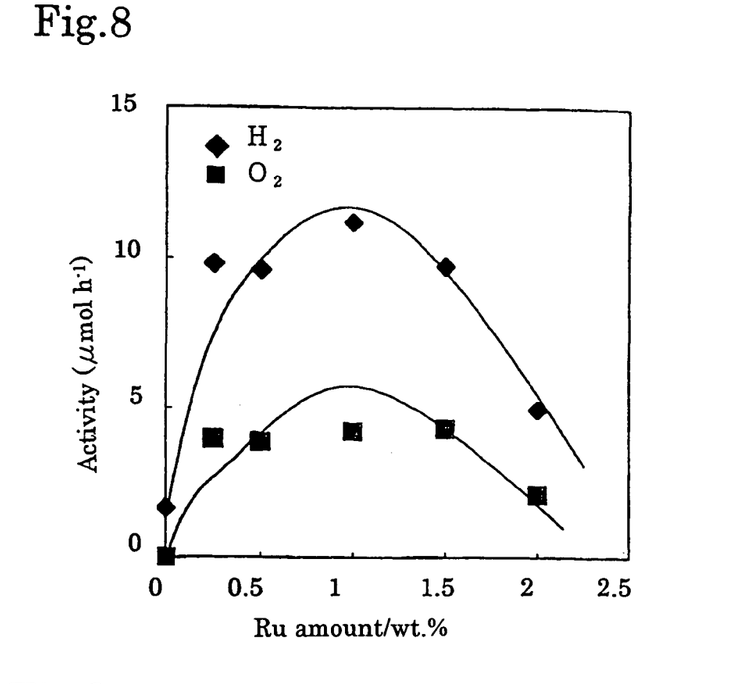
FIG. 8 shows the relationship of the $RuO_2$ loading amount which has influence on the photo-catalytic activity of $RuO_2/Na_4Nb_8P_4O_{32}$.

Relationship between $RuO_2$ loading amount and catalytic activity; In FIG. 8, the dependency of loading amount of $RuO_2$ which has influence on the photo-catalytic activity of $RuO_2/Na_4Nb_8P_4O_{32}$. The activity was improved slowly from 0.25 wt % to 1 wt %, and displayed the maximum activity at 1 wt %, further, when the loading amount of $RuO_2$ exceeded 1 wt %, the activities of $H_2$ and $O_2$ were both deteriorated.

Figure 9:
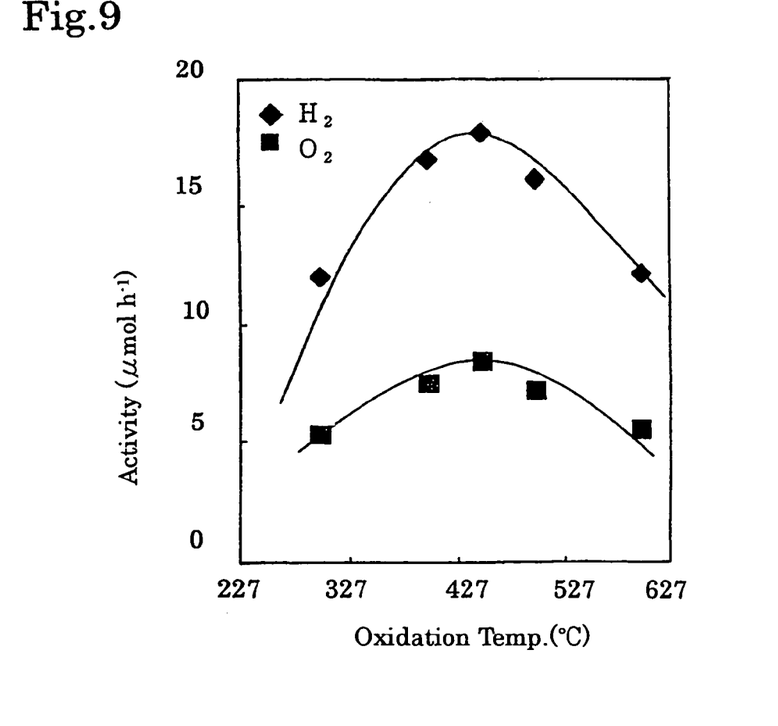
FIG. 9 shows the oxidation temperature dependency of $Ru_3(CO)_{12}$ complex which has influence on the photo-catalytic activity of $RuO_2/Na_4Nb_8P_4O_{32}$.

Relationship between oxidation temperature after Ru is loaded and photo-catalytic activity In FIG. 9, change of the photo-catalytic activity of $RuO_2/Na_4Nb_8P_4O_{32}$ prepared by changing the oxidation temperature of the loaded $Ru_3(CO)_{12}$ complex is shown. When the oxidation treatment temperature was elevated from 300° C., the activity was also improved, indicated the maximum activity at 450° C. and $H_2$, $O_2$ generating almost accomplished the stoichiometric ratio. When the oxidation temperature was elevated more, the $H_2$ generating activity and $O_2$ generating activity were both deteriorated.

Example 2

X-ray Diffraction Pattern of $A_4Ta_8P_4O_{32}$ (A=Li or Na);

Although the X-ray diffraction pattern of the compounds of $Li_4Ta_3P_4O_{32}$ and $Na_4Ta_3P_4O_{32}$ were not recorded as JCPD card, regarding $Li_4Ta_3P_4O_{32}$, strong peaks appeared at $2\theta=20.24°$, 22.26° and 23.94° and very similar to the X-ray diffraction pattern of $Na_4Nb_8P_4O_{32}$. In the X-ray diffraction pattern of $Na_4Ta_3P_4O_{32}$ prepared by changing the calcination temperature from 800° C. to 1100° C., in the case of $Na_4Ta_3P_4O_{32}$ calcined at 800° C., the peak of $Ta_2O_5$ which is a starting material remained clearly besides the peak based on $Na_4Ta_3P_4O_{32}$. At the calcination by 800° C., the peak of $Ta_2O_5$ reduced remarkably, the peak based on $Na_4Ta_3P_4O_{32}$ became higher. At the calcination by 1000° C., the peak became almost only one peak based on $Na_4Ta_3P_4O_{32}$. At the calcination by 1000° C., the strong peak of $Na_4Ta_3P_4O_{32}$ appeared.

Diffuse Reflectance Spectrum of $A_4Ta_8P_4O_{32}$ (A=Li, Na)

Figure 10:
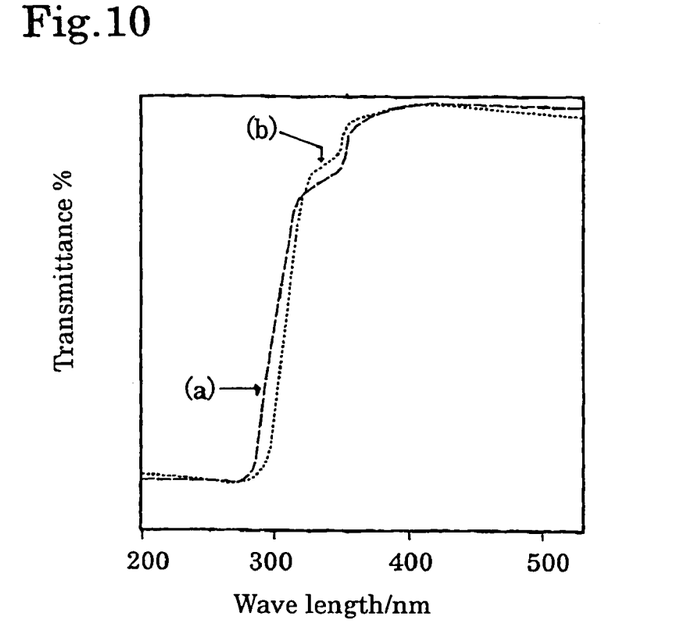
FIG. 10 shows the diffuse reflectance spectrum of $Li_4Ta_3P_4O_{32}$ and $Na_4Ta_8P_4O_{32}$.

In FIG. 10, diffuse reflectance spectrum of $Li_4Ta_3P_4O_{32}$ (a) and $Na_4Ta_8P_4O_{32}$ (b) are shown. In the case of $Li_4Ta_3P_4O_{32}$, the photo absorption started from 390 nm, had a absorption shoulder at 350 nm around and indicated the maximum absorption at 280 nm. In the case of $Na_4Ta_8P_4O_{32}$, indicates same absorption pattern, namely, the photo absorption started from 380 nm, the absorption shoulder of 345 nm around appeared small and the sharp absorption 300 nm around shifted to the longer wave length side. The wave-length of the maximum absorption was 285 nm.

Figure 11:
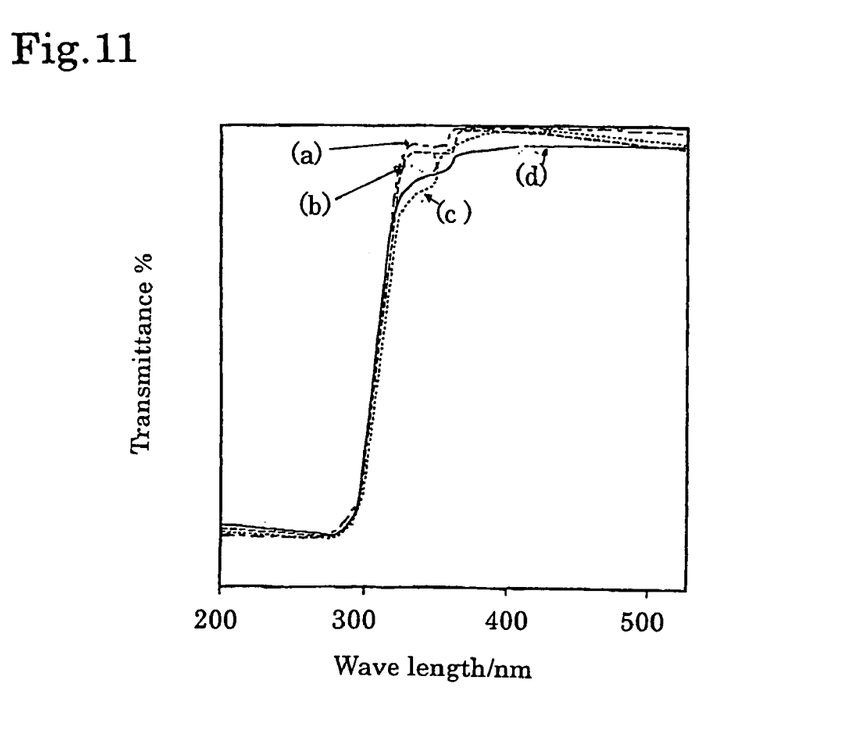
FIG. 11 shows the diffuse reflectance spectrum of $Na_4Ta_8P_4O_{32}$ prepared by calcination temperature of (a) 800° C., (b) 900° C., (c) 1000° C. and (d) 1100° C.

In FIG. 11, the diffuse reflectance spectrum of $Na_4Ta_8P_4O_{32}$ prepared by calcination temperature of 800° C. (a)–1100° C. (d). In the case of 800° C. (a), photo absorption started from 360 nm, the absorption shoulder appeared closely and the maximum absorption appeared at 280 nm around. When the calcination temperature elevated to 1100° C. (d), the absorption starting wave length and the maximum absorption wave length did not change. However, the absorption shoulder, which appears from 340 nm to 310 nm, increased along with the elevation of the calcination temperature within the region from 800° C. to 1000° C., on the contrary, at the calcination temperature of 1100° C., it decreased slightly.

SEM image of $A_4Ta_8P_4O_{32}$ (A=Li or Na) and average particle size; According to the observation of SEM images of $Na_4Ta_8P_4O_{32}$ which were calcined at the calcination temperature from 800° C. to 1000° C., it was understood that the shape of said $Na_4Ta_8P_4O_{32}$ particles were ununiform block shape. By the elevation of the calcination temperature from 800° C. to 1000° C., the particle size became larger radically from 2.9 μm to 5.3 μm, and from 900° C. to 1100° C., the particle size became larger generously from 5.3 μm to 7.6 μm.

Example of the Photo-catalytic Reaction;

Decomposing reaction of water by $RuO_2$-loaded $A_4Ta_8P_4O_{32}$ (A=Li or Na);

The photo-catalyst was prepared by loading $RuO_2$ on $A_4Ta_8P_4O_{32}$ (A=Li or Na) and carried out the photo-catalyst reaction experiment aiming photo decomposition of water.

Change of Reaction by Time Lapse

Figure 12:
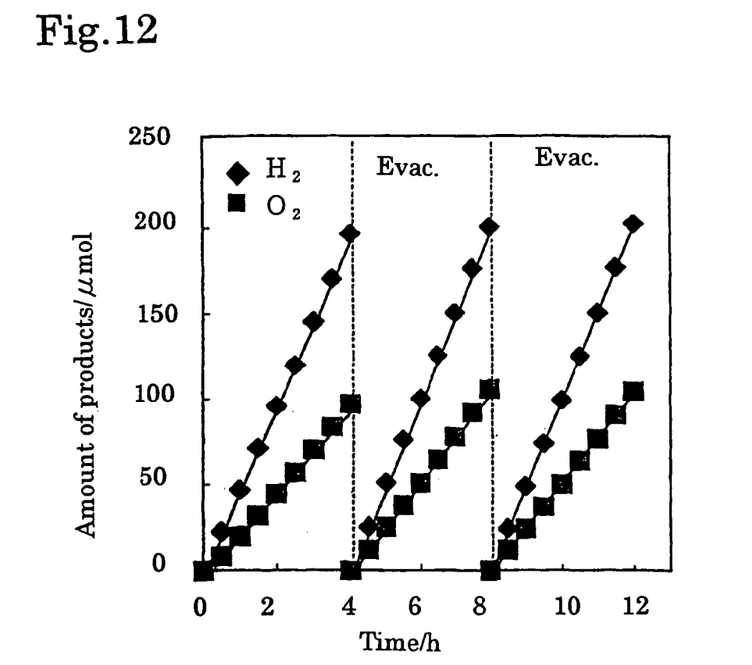
FIG. 12 shows photo-catalytic reaction in repeated run on a $RuO_2/Na_4Ta_8P_4O_{32}$ photo-catalyst under 200W Hg—Xe lamp as a light source. $Na_4Ta_8P_4O_{32}$ was obtained by calcination at 900° C. and loaded Ru species was oxidized at 450° C.

In FIG. 12, photo-catalytic reaction in repeated run on a $RuO_2/Na_4Ta_8P_4O_{32}$ photo-catalyst under 200W Hg—Xe lamp as a light source is shown. $Na_4Ta_8P_4O_{32}$ was obtained by calcination at 900° C. and loaded Ru species was oxidized at 450° C. In the first run, $H_2$ and $O_2$ generation increased linearly from the initial stage of the photo irradiation. Even if the gaseous component was exhausted (deaerated) and the run was repeated, the activity was almost same, and the stable generation of $H_2$ and $O_2$ could be also observed in the third repeated run, and the generation ratio of $H_2$ and $O_2$ was 2:1.

Figure 13:
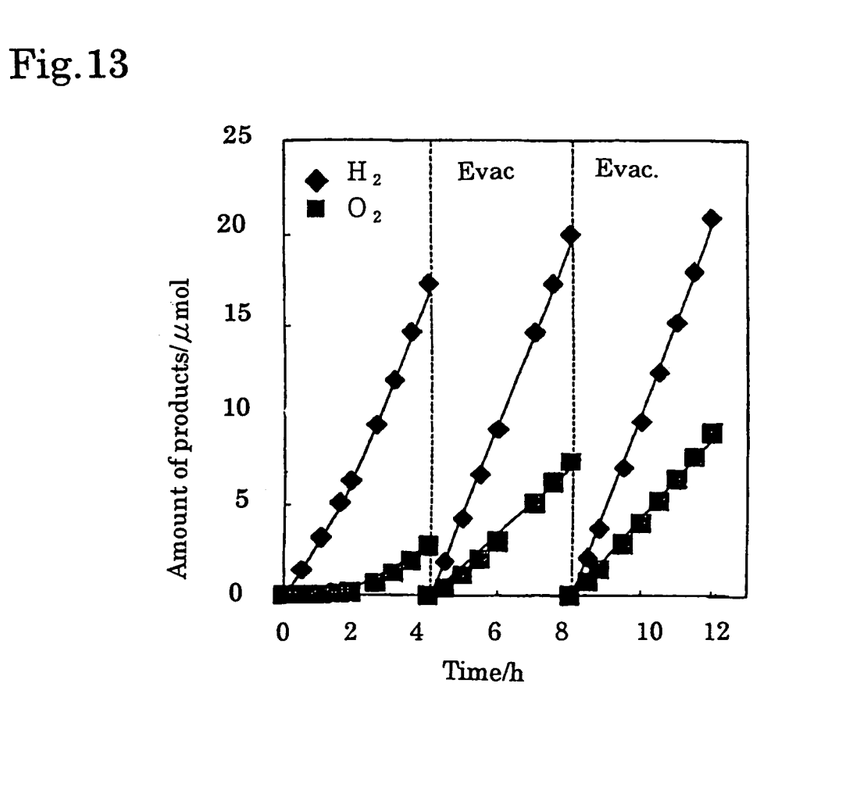
FIG. 13 shows photo-catalytic reaction in repeated run on a $RuO_2/Na_4Ta_8P_4O_{32}$ photo-catalyst under 400W Xe lamp as a light source. $Na_4Ta_8P_4O_{32}$ was obtained by calcination at 900° C. and loaded Ru species was oxidized at 450° C.

In FIG. 13, photo-catalytic reaction in repeated run on a $RuO_2/Na_4Ta_8P_4O_{32}$ photo-catalyst under 400W Xe lamp as a light source is shown. $Na_4Ta_8P_4O_{32}$ was obtained by calcination at 900° C. and loaded Ru species was oxidized at 450° C. In the first run, the induction period was observed at the initial stage of the reaction, and after 2 hours lapse generation of $H_2$ and $O_2$ became stable. When the run was repeated, the induction period was observed from the second run, and the stable generation of $H_2$ and $O_2$ could be observed from the initial stage of the photo irradiation. Regarding the generating amount, become normal after second run.

Figure 14:
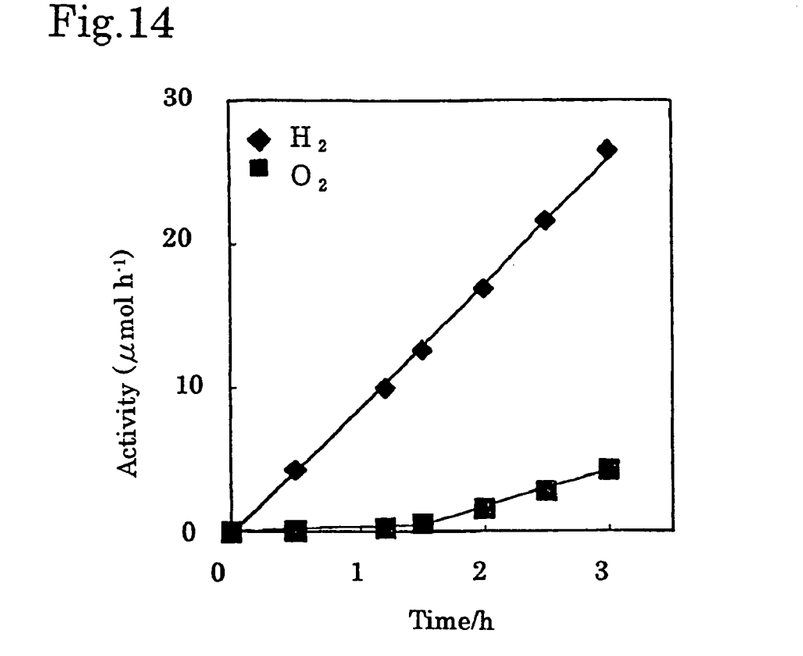
FIG. 14 shows photo-catalytic reaction in repeated run on a $RuO_2/Li_4Ta_8P_4O_{32}$ photo-catalyst under 200W Hg—Xe lamp as a light source. $Li_4Ta_8P_4O_{32}$ was obtained by calcination at 900° C. and loaded Ru species was oxidized at 450° C.

In FIG. 14, photo-catalytic reaction of water decomposition in repeated run on a $RuO_2/Li_4Ta_8P_4O_{32}$ photo-catalyst under 200W Hg—Xe lamp as a light source is shown. $Li_4Ta_8P_4O_{32}$ was obtained by calcination at 900° C. and loaded Ru species was oxidized at 450° C. $H_2$ generation was stable from the start of photo irradiation. $O_2$ generation increased gradually from the initial stage of the reaction and become stable after 1.5 hours.

Comparison of photo-catalytic activity of $RuO_2/A_4Ta_8P_4O_{32}$ (A=Li or Na)

Figure 15:
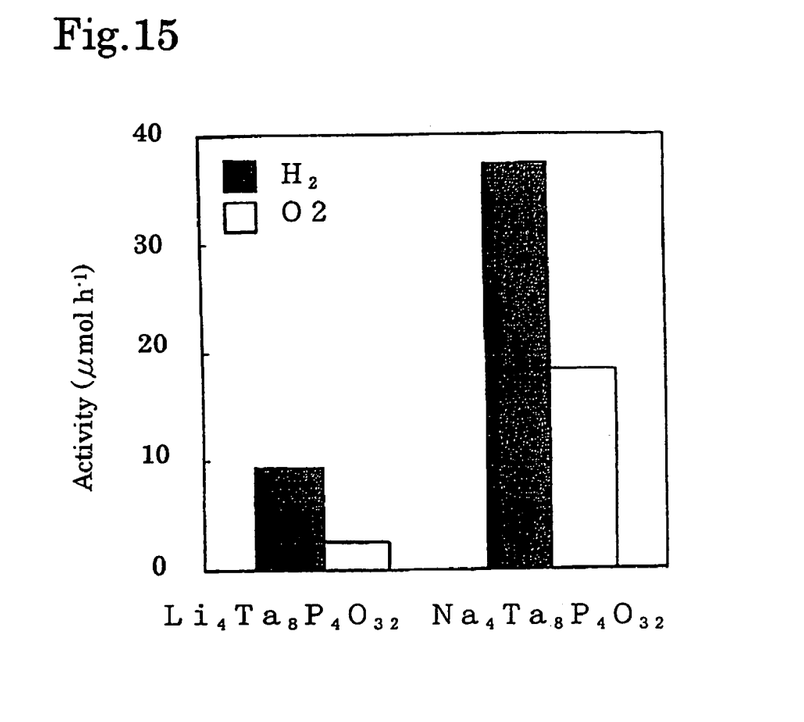
In FIG. 15, the photo-catalyst reaction rate of $RuO_2/Li_4Ta_8P_4O_{32}$ and $RuO_2/Na_4Ta_8P_4O_{32}$ at steady state are shown in comparison.

The photo-catalytic reaction rate at the steady state of $RuO_2/Li_4Ta_8P_4O_{32}$ and $RuO_2/Na_4Ta_8P_4O_{32}$ were compared and the results are shown in FIG. 15.

$RuO_2/Na_4Ta_8P_4O_{32}$ indicated 4 times higher activity than $RuO_2/Li_4Ta_8P_4O_{32}$.

Figure 16:
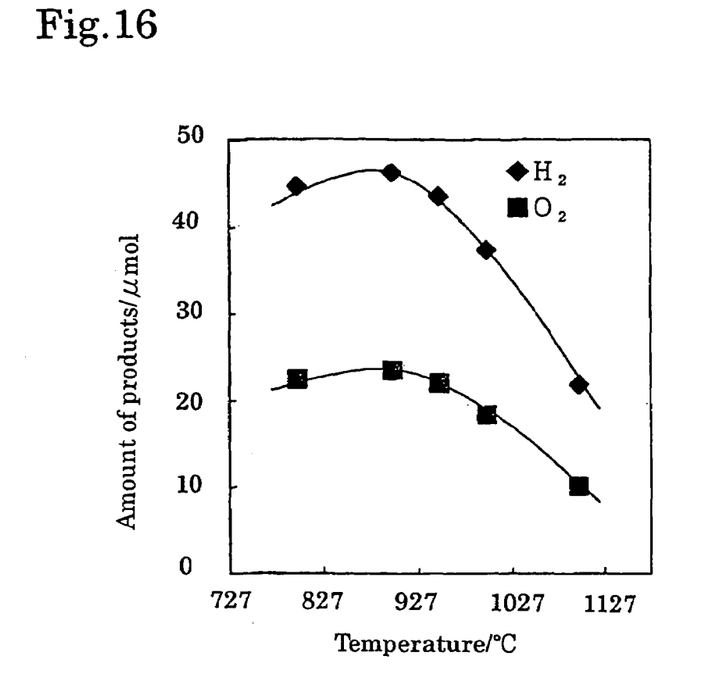
FIG. 16 shows the relationship of the calcination temperature of $Na_4Ta_8P_4O_{32}$ which has influence on the photo-catalytic activity of $RuO_2/Na_4Ta_8P_4O_{32}$.

The relationship between calcination temperature of $Na_4Ta_8P_4O_{32}$ and the photo-catalytic activity in the photo-catalytic activity of $RuO_2/Na_4Ta_8P_4O_{32}$;

In FIG. 16, the change of photo-catalytic activity when the calcination temperature of $Na_4Ta_8P_4O_{32}$ was changed from 800° C. to 1100° C. is shown. The activity improved generously from 800° C. to 1100° C., and indicated the maximum activity at 900° C. When the calcination temperature is further elevated, the photo-catalytic activity deteriorated suddenly at 1100° C. $H_2/O_2$ generation ratio in the region from 800° C. to 1100° C. was 2:1.

Figure 17:
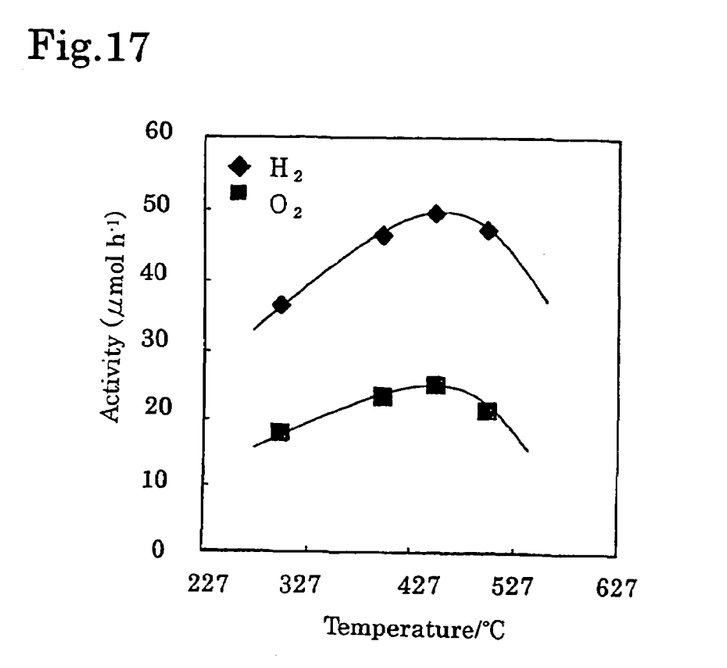
FIG. 17 shows the oxidation temperature dependency of $Ru_3(CO)_{12}$ complex which has influence on the photo-catalytic activity of $RuO_2/Na_4Ta_8P_4O_{32}$.

Ru oxidation temperature dependency of $RuO_2/Na_4Ta_8P_4O_{32}$;

Ru oxidation temperature dependency is shown in FIG. 17. When the oxidation temperature was elevated from 300° C., the activity was also improved and indicated the maximum activity at 450° C.

Figure 18:
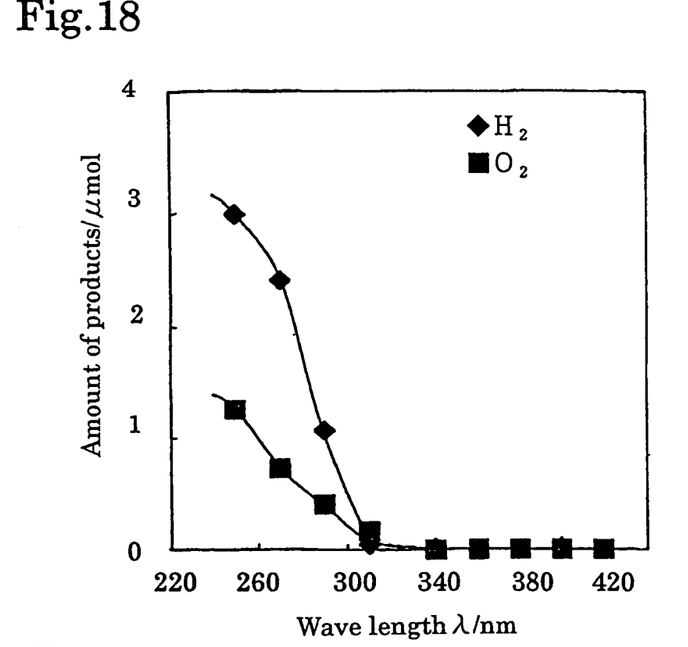
FIG. 18 shows the irradiation light dependency of $RuO_2/Na_4Ta_8P_4O_{32}$ photo-catalyst obtained by using a light source characterizing by combining 400W Xe lamp and a wavelength cut off filter.

Irradiation light dependency of $RuO_2/Na_4Ta_8P_4O_{32}$ photo-catalyst;

In FIG. 18, the change of photo-catalytic activity of $RuO_2/Na_4Ta_8P_4O_{32}$ when the wave length of irradiation light was changed is shown.

An Xe-lamp and a cut off filter was used as the light source. By the longer wave length than 340 nm both $H_2$ and $O_2$ did not generate, and small generation of $H_2$ was observed at 340 nm around, further, $O_2$ generated from 310 nm around. By the irradiation of shorter wave length than 310 nm, the generating activity of $H_2$ and $O_2$ improved remarkably.

Example 3

Figure 19:
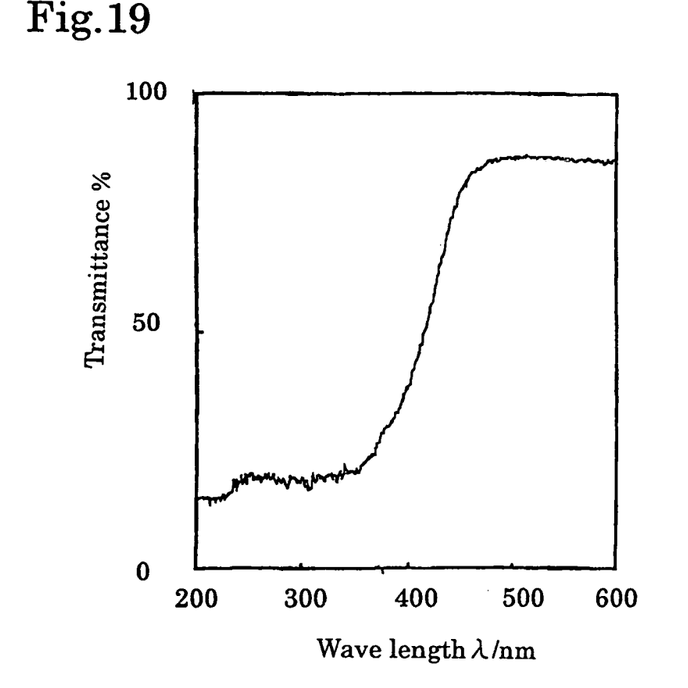
FIG. 19 shows the diffuse reflectance spectrum of $Na_3InP_2O_8$.

Diffuse Reflectance Spectrum of $Na_3InP_2O_8$;

As shown in FIG. 19, the photo absorption started at 480 nm, and the maximum absorption wave length was observed at around 380 nm. The absorption end existed in visible light region. The dipole moment was 0.5 debye.

While the Dipole Moment of $Na_3In_2P_3O_{12}$ was 3.5 Debye.

Figure 20:
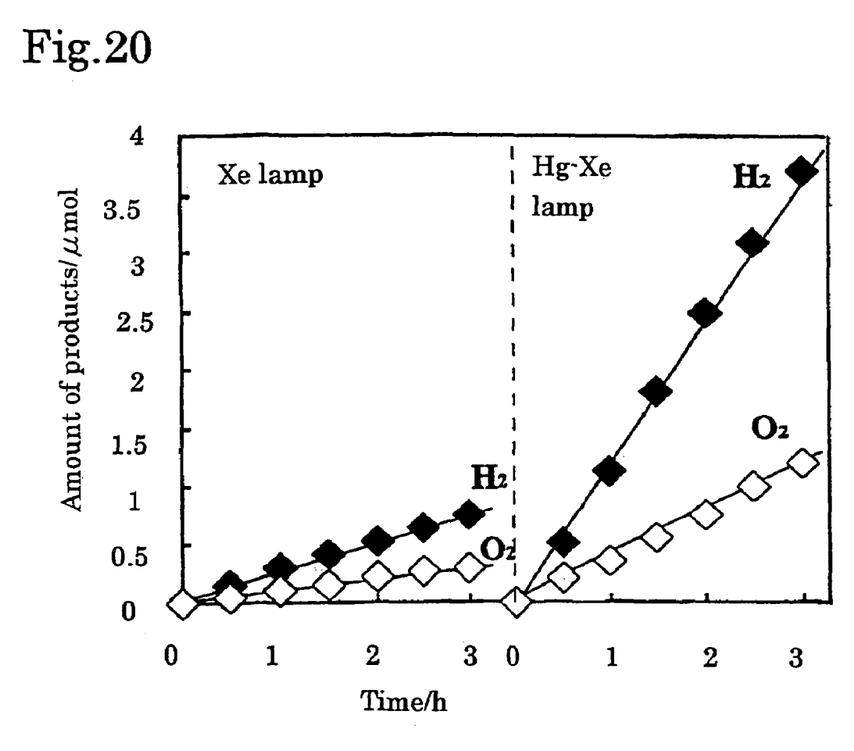
FIG. 20 shows the change by time lapse of reaction by $RuO_2/Na_3InP_2O_8$ and Hg—Xe lamp.

Photo Decomposition Characteristic of $RuO_2/Na_3InP_2O_8$;

The change by time lapse of reaction by $RuO_2/Na_3InP_2O_8$ and Hg—Xe lamp is shown in FIG. 20. The generation of $H_2$ and $O_2$ increased linearly from the initial stage of the light irradiation.

INDUSTRIAL APPLICABILITY

As mentioned above, since the novel photo-catalyst of the present invention can proceed the complete decomposition of water, the present invention provides a photo active catalyst for water decomposition which is closing more to the practical use. Namely, provides an excellent effect to the concerned industry.

The invention claimed is:

1. A $RuO_2$-loaded photo-catalyst, comprising a compound having structure composing a network formed by mutual connection of an unit constructing oxygen octahedra or tetrahedra containing a transition metal ion or a metallic ion in $d^{10}$ or $d^0$ configuration and an unit constructing $PO_4$ tetrahedra connected to said oxygen octahedra or tetrahedra, further containing an alkali metal besides said transition metal ion or metallic ion as a consituent element.

2. A photo-catalyst for complete decomposition of water composed of the photo-catalyst of claim 1.

3. The $RuO_2$-loaded photo-catalyst of claim 1, wherein a metal composing the transition metal ion or metallic ion in $d^0$ configuration is Nb or Ta and chemical composition of the compound is $A_xMe_{2m}P_4O_{6m+8}$, wherein A is Na, K or Li, Me is Nb or Ta, X is 2, 3 or 4 and m is 3, 3.5 or 4.

4. A photo-catalyst for complete decomposition of water composed of the photo-catalyst of claim 3.

5. The $RuO_2$-loaded photo-catalyst of claim 3, wherein the oxygen octahedra containing the transition metal ion or metallic ion in $d_0$ configuration is strained structure and has dipole moment and has a network structure.

6. A photo-catalyst for complete decomposition of water composed of the photo-catalyst of claim 5.

7. The $RuO_2$-loaded photo-catalyst of claim 5, wherein the structure composing of the network is belonging to tungsten bronze phosphates having tunnel-like structure.

8. A photo-catalyst for complete decomposition of water composed of the photo-catalyst of claim 7.

9. The $RuO_2$-loaded photocatalyst of claim 1, wherein a metal composing the transition metal ion or metallic ion in $d^{10}$ configuration is In and chemical composition of the compound is $A_3In_mP_{m+1}O_{4m+4}$, wherein A is Na, K or Li ion and m is 1 or 2.

10. A photo-catalyst for complete decomposition of water composed of the photo-catalyst of claim 9.

11. The $RuO_2$-loaded photo-catalyst of claim 9, wherein the oxygen octahedra containing the transition metal ion or metallic ion in $d^{10}$ configuration is strained structure and has dipole moment and has a network structure.

12. A photo-catalyst for complete decomposition of water composed of the photo-catalyst of claim 11.

* * * * *